US009267485B2

(12) United States Patent
Ravi et al.

(10) Patent No.: US 9,267,485 B2
(45) Date of Patent: Feb. 23, 2016

(54) SYSTEM AND METHOD FOR CONTROL OF A TRANSITION BETWEEN SI AND HCCI COMBUSTION MODES

(71) Applicant: Robert Bosch GmbH, Stuttgart (DE)

(72) Inventors: Nikhil Ravi, Mountain View, CA (US); Joel Oudart, Sunnyvale, CA (US); Nalin Chaturvedi, Sunnyvale, CA (US); David Cook, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 186 days.

(21) Appl. No.: 14/185,278

(22) Filed: Feb. 20, 2014

(65) Prior Publication Data
US 2014/0230786 A1 Aug. 21, 2014

Related U.S. Application Data

(60) Provisional application No. 61/767,726, filed on Feb. 21, 2013.

(51) Int. Cl.
F02D 41/26 (2006.01)
F02D 41/40 (2006.01)
F02P 5/04 (2006.01)
F02D 41/30 (2006.01)
F02D 41/14 (2006.01)

(52) U.S. Cl.
CPC ............ *F02P 5/045* (2013.01); *F02D 41/3035* (2013.01); *F02D 41/3041* (2013.01); *F02D 41/3064* (2013.01); *F02D 41/14* (2013.01); *F02D 41/401* (2013.01); *F02D 2041/141* (2013.01); *Y02T 10/128* (2013.01)

(58) Field of Classification Search
CPC .. F02P 5/045; F02D 41/3035; F02D 41/3064; F02D 41/3041; F02D 41/401; F02D 2041/141
USPC .................. 123/90.15, 299, 300, 433, 406.24, 123/406.26, 436; 701/103–105, 110
See application file for complete search history.

(56) References Cited

U.S. PATENT DOCUMENTS 7,274,986 B1 * 9/2007 Petridis ............... F02D 41/3076
123/295
7,370,616 B2 * 5/2008 Kuo ........................ F01L 1/344
123/568.14

(Continued)

OTHER PUBLICATIONS

International Search Report and Written Opinion corresponding to PCT Application No. PCT/US2014/017471, mailed May 27, 2014 (9 pages).

*Primary Examiner* — Hai Huynh
(74) *Attorney, Agent, or Firm* — Maginot Moore & Beck LLP

(57) ABSTRACT

In one embodiment a method of controlling an engine system includes providing a first cylinder with a first inlet valve, a first outlet valve, and a first throttle, controlling the first inlet and the first outlet valve in accordance with an SI valve lift profile, activating a first spark in the first cylinder while controlling the first inlet and the first outlet valve in accordance with the SI valve lift profile, controlling the first inlet and the first outlet valve in accordance with an HCCI valve lift profile, activating a second spark in the first cylinder while controlling the first inlet and the first outlet valve in accordance with the HCCI valve lift profile, and controlling the SOI timing of the first throttle in an HCCI SOI mode while controlling the first inlet valve and the first outlet valve in the HCCI valve lift profile after activating the second spark.

18 Claims, 12 Drawing Sheets

(56) References Cited

U.S. PATENT DOCUMENTS

| | | | |
|---|---|---|---|
| 7,481,185 B1* | 1/2009 | Park | F02B 1/12 123/21 |
| 8,616,182 B2* | 12/2013 | Wermuth | F01N 3/101 123/406.5 |
| 8,955,492 B2* | 2/2015 | Wermuth | F02B 17/005 123/305 |
| 2004/0134462 A1* | 7/2004 | Strom | F02B 1/12 123/294 |
| 2008/0066713 A1 | 3/2008 | Megli et al. | |
| 2008/0066715 A1* | 3/2008 | Jankovic | F02B 17/005 123/305 |
| 2008/0071462 A1 | 3/2008 | Christ et al. | |
| 2009/0312936 A1* | 12/2009 | Kakuya | F02D 13/0207 701/103 |
| 2011/0276251 A1* | 11/2011 | Kang | B60K 6/48 701/103 |
| 2011/0283972 A1 | 11/2011 | Wermuth et al. | |
| 2012/0255517 A1* | 10/2012 | Grover, Jr. | F02M 69/045 123/299 |
| 2013/0080026 A1* | 3/2013 | Kang | F02M 25/0752 701/102 |
| 2013/0213349 A1* | 8/2013 | Sellnau | F02M 25/07 123/295 |
| 2014/0026852 A1* | 1/2014 | Jiang | F02D 41/30 123/344 |

* cited by examiner

SYSTEM AND METHOD FOR CONTROL OF A TRANSITION BETWEEN SI AND HCCI COMBUSTION MODES

This application claims the benefit of U.S. Provisional Application No. 61/767,726 filed Feb. 21, 2013, the entirety of which is incorporated herein by reference.

TECHNICAL FIELD

This disclosure relates to a control system for transition between a spark ignited (SI) combustion and homogeneous charge compression ignition (HCCI) combustion on internal combustion engines (ICE).

BACKGROUND

Homogenous Charge Compression Ignition (HCCI) is an advanced combustion concept for piston engines that offers significant efficiency and emissions benefits over current technologies. The HCCI combustion process has been studied for over two decades, and has shown promise as a potential technology for automotive engines that can improve on the efficiency and emissions capabilities of current technologies.

In HCCI, a homogeneous mixture of air, fuel and hot exhaust gases is compressed until auto-ignition occurs. Consequently, combustion is not initiated by a spark. Rather, precise conditions are established within a cylinder such that simply by compressing the gases within the cylinder ignition is initiated. HCCI is thus highly dependent upon the in-cylinder temperature and composition of gases. In order to provide a desired temperature for HCCI ignition, a significant amount of hot exhaust gas from the previous combustion cycle is typically trapped within the cylinder to enable this auto-ignition; however, other methods for initiating HCCI have also been tested, including increasing the compression ratio and heating the intake air.

A significant benefit to incorporating HCCI is that HCCI engines can be run fully unthrottled, significantly reducing pumping losses that are typical in a spark-ignited (SI) engine, thereby boosting the efficiency. Additionally, due to the highly diluted reactant mixture and absence of a flame, peak combustion temperatures are much lower, which reduces NOx emissions significantly.

The provision of an HCCI only system is problematic, however, because of load limitations. Auto-ignition occurs with very high pressure rise rate leading to the phenomenon of ringing at higher loads which is structurally undesirable for the engine. Hence there is a cap on the maximum power output in HCCI. At the low load end, HCCI mode is harder to maintain because the temperature required to auto-ignite cannot be achieved. HCCI mode is also not possible at lower speeds as the chemical breakdown of species to initiate auto-ignition is at a very slow rate at lower speeds. This leads to unstable operation or misfire.

Therefore there exists only a limited operational region for running an engine efficiently and stably in HCCI mode. Accordingly, attempts have been made to incorporate HCCI mode in an automotive engine by combining it with the conventional SI mode. In these approaches, SI mode is used during cold startup periods and during ramping up the engine through low-speed and low loads. In the region of medium to medium-high loads, the engine can be operated in HCCI mode, maximizing the efficiency and minimizing emissions. The mode can be switched back to SI when the power demand exceeds the upper-load limit of the HCCI mode.

Transitioning smoothly from one mode to another however, presents additional challenges. For example, maintaining a desired torque during mode switching can be challenging due to the significant differences between SI and HCCI operating conditions. Therefore, implementation of HCCI on a production engine requires advanced control algorithms. The control algorithms are complicated due to the lack of a direct ignition trigger (such as a spark), and the cycle-to-cycle dynamics introduced by the trapped exhaust gas in an HCCI mode. Several modeling and control approaches for steady-state and transient control of HCCI have been presented in the literature.

As evident from the foregoing discussion, transitions between HCCI and traditional SI mode are necessary both at the low load/speed as well as the mid-high load/speed end of the operating range. This is shown schematically in FIG. 1. In FIG. 1, the region of engine loads/engine speeds wherein HCCI mode is advantageous is indicated by area 10. The area 12 identifies the allowable operating region of SI mode Accordingly, as an engine transitions along a line 14 from a low speed/low load condition to a high speed high load condition, the engine will optimally transition from SI mode to HCCI mode at location 16 and transition from HCCI mode to SI mode again at location 18. Similarly, as an engine transitions along a line 20 from a high speed/high load condition to a low speed/low load condition, the engine will optimally transition from SI mode to HCCI mode at location 22 and transition from HCCI mode to SI mode again at location 24.

To accomplish the desired mode switching, HCCI engines are typically implemented either with a fully flexible variable valve actuation system, or with dual cam phasers. The former is suitable only for research purposes, and is not feasible to implement on a production setup. Dual cam phasers for HCCI engines are typically designed with two sets of valve profiles, one for SI mode and one for HCCI mode.

FIG. 2 shows a typical example of SI and HCCI valve lift and open/close profiles. Line 30 identifies the valve lift position of the exhaust valve versus crankshaft angle degree (CAD) in an SI mode and the line 32 identifies the valve lift position of the intake valve versus CAD in an SI mode. The line 34 identifies the valve lift position of the exhaust valve versus CAD in HCCI mode and the line 36 identifies the valve lift position of the intake valve versus CAD in HCCI mode. The maximum heights of the lines 30, 32, 34, and 36 are referred to herein as "valve lift profiles", while the CAD at which the lines depart and return to 0 mm is referred to as the valve "open/close" or "timing" profile.

FIG. 2 shows that in SI mode, it is desirable to have high valve lifts (lift profile), and long open valve durations (open/close profile), while in HCCI mode it is preferable to have low valve lifts and short open valve durations (to allow for trapping of exhaust gases). Consequently, a transition from SI to HCCI also involves a switch from the SI valve profiles (both lift and timing profiles) to the HCCI valve profiles, which can introduce significant dynamics.

Different approaches for switching between the two modes have been presented in the literature, including single-step switches as well as transitions that happen more gradually over several cycles. Some control approaches have also been presented in the literature—one article shows a control approach to switch from SI with early intake valve closing to HCCI, where fuel quantity and valve timings are controlled during the switch; another article presents an approach to control load and air fuel ratio during a multi-cycle transition from SI to HCCI. All these methods, however, result in undesired dynamics.

What is needed therefore is a control system which provides for transitions between SI and HCCI modes while exhibiting improved dynamics.

SUMMARY

In one embodiment, an engine system includes a first cylinder, a first inlet valve configured to control the flow of gases into the first cylinder, a first outlet valve configured to control the flow of gases out of the first cylinder, a first throttle configured to control the flow of fuel into the first cylinder, a memory including program instructions stored therein, and a processor operably connected to the first inlet valve, the first outlet valve, the first throttle, and the memory, and configured to execute the program instructions to control the first inlet valve and the first outlet valve in accordance with a spark ignition (SI) valve lift profile, activate a first spark in the first cylinder while controlling the first inlet valve and the first outlet valve in accordance with the SI valve lift profile, control the first inlet valve and the first outlet valve in accordance with a homogeneous charge compression ignition (HCCI) valve lift profile, activate a second spark in the first cylinder while controlling the first inlet valve and the first outlet valve in accordance with the HCCI valve lift profile, and control the start-of-injection (SOI) timing of the first throttle in an HCCI SOI mode while controlling the first inlet valve and the first outlet valve in the HCCI valve lift profile after activating the second spark.

In another embodiment a method of controlling an engine system includes providing a first cylinder with a first inlet valve, a first outlet valve, and a first throttle, controlling the first inlet valve and the first outlet valve in accordance with a spark ignition (SI) valve lift profile, activating a first spark in the first cylinder while controlling the first inlet valve and the first outlet valve in accordance with the SI valve lift profile, controlling the first inlet valve and the first outlet valve in accordance with a homogeneous charge compression ignition (HCCI) valve lift profile, activating a second spark in the first cylinder while controlling the first inlet valve and the first outlet valve in accordance with the HCCI valve lift profile, and controlling the start-of-injection timing (SOI) of the first throttle in an HCCI SOI mode while controlling the first inlet valve and the first outlet valve in the HCCI valve lift profile after activating the second spark.

DETAILED DESCRIPTION

Figure 1:
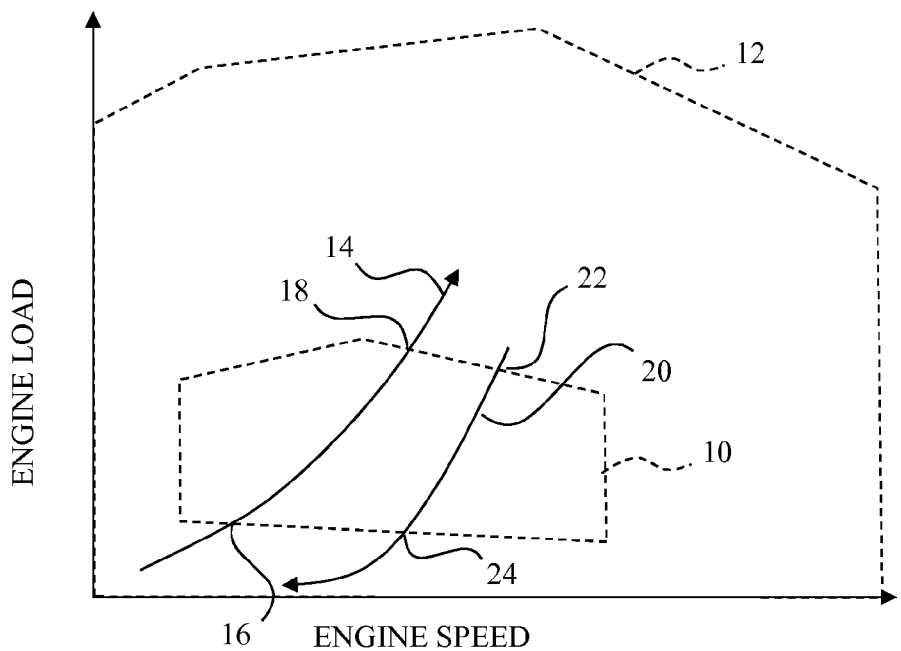
FIG. 1 depicts a schematic of SI and HCCI operating regimes and transitions between them.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Figure 3:
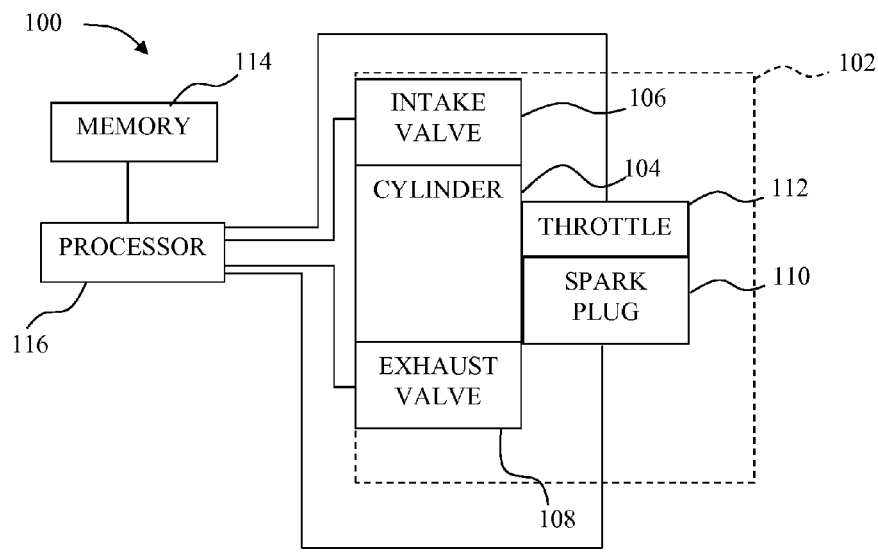
FIG. 3 depicts an engine system in accordance with principles of the disclosure.

FIG. 3 depicts an engine system 100 including an engine 102. The engine includes at least one cylinder 104. While only one cylinder 104 and associated components are shown, in some embodiments a plurality of cylinders 104 are incorporated. Associated with the cylinder 104 are an engine intake valve 106, an engine exhaust valve 108, and a spark plug 110. A throttle 112 controls flow of fuel into the cylinder 104.

The engine system 100 further includes a memory 114 and a processor 116. Various program instructions, discussed in further detail below, are programmed into the memory 114. The processor 116 is operable to execute the program instructions programmed into the memory 114. The processor 116 is operably connected to the engine intake valve 106, the engine exhaust valve 108, the spark plug 110, and the throttle 112. The processor 116 is also operably connected to other sensors and controllers, some of which are described in further detail below.

Figure 4:
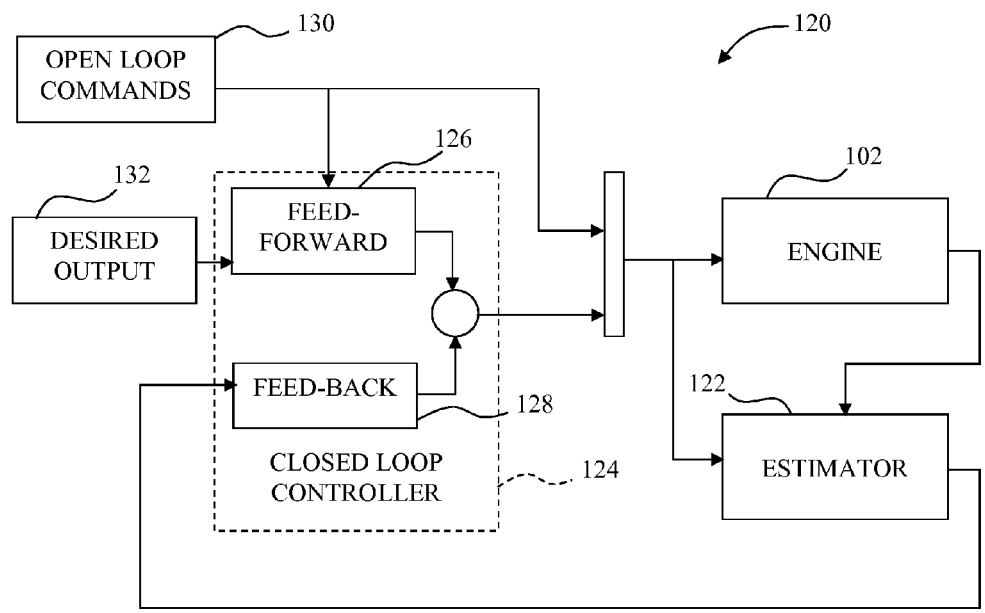
FIG. 4 depicts a schematic of a control structure provided by execution of program instructions stored in the memory of FIG. 3.

The processor 116 executes the program instructions stored within the memory 114 to provide a command structure 120 depicted in FIG. 4. The processor 116 thus provides an estimator 122 and a closed-loop controller 124 which provides a feed-forward function 126 and a feedback function 128 which are used to control the engine 102. In general, open-loop commands 130 which are provided to the engine 102 are also provided to the feed-forward function 126 which also receives desired outputs 132. The feedback function 128 receives input in the form of states from the estimator 122 which estimates the states based upon output of the engine 102. The combined output from the feedback function 128 and the feed-forward function 126 is used to control the engine 102 and as an input to the estimator 122.

The controller 124 thus operates based on an estimate of states (such as mixture temperature, reactant concentrations etc.) generated by the estimator 122 that uses engine outputs (such as combustion phasing, or work output) to observe the states. For example, two of the states used by the processor, oxygen concentration and temperature, are not directly measured in this embodiment. Rather, these values are estimated based upon the estimator 122 which uses a measurement of "$CA_{50}$". "$CA_{50}$" is defined as the crankshaft angle at which 50% of the energy from combustion has been released.

Figure 2:
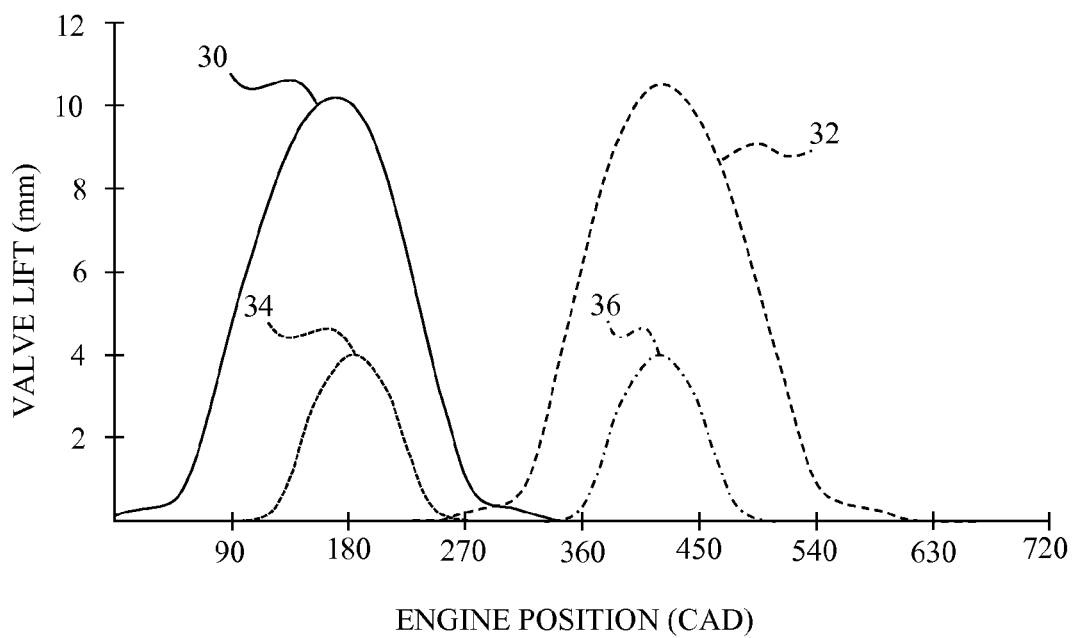
FIG. 2 depicts a chart of example valve profiles in SI and HCCI operational modes.

The control strategy is based on an approach that involves operation of SI with the same low-lift valve profile as in HCCI—therefore the combustion mode switch dynamics are decoupled from the dynamics of switching valve profiles from the high-lift, long-duration profile typically used in SI to the low-lift, short-duration profile used for HCCI as described above with respect to FIG. 2. A switched control scheme is provided, with three control/estimation modes defined during each transition.

Figure 5:
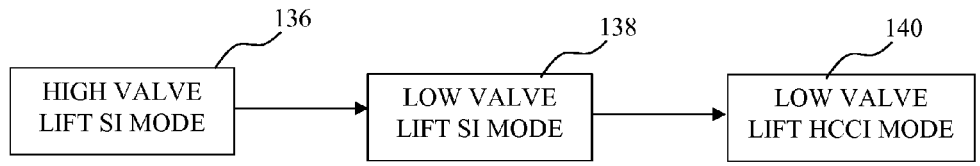
FIG. 5 depicts an SI to HCCI transition strategy controlled by the control structure of FIG. 4.

FIG. 5 depicts the general control process when proceeding along the line 14 of FIG. 1 the processor 116 initially controls the engine intake valve 106 and the engine exhaust valve 108 in a high valve lift SI mode 136. When a transition is required, the processor 116 controls the engine intake valve 106 and the engine exhaust valve 108 in a low valve lift SI mode 138. Once the conditions for HCCI are met, the processor 116 controls the engine intake valve 106 and the engine exhaust valve 108 in a low valve lift HCCI mode 140.

Figure 6:
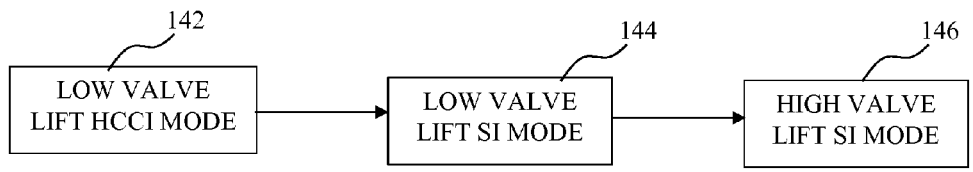
FIG. 6 depicts an HCCI to SI transition strategy controlled by the control structure of FIG. 4.

FIG. 6 depicts the general control process when proceeding along the line 20 of FIG. 1. The processor 116 initially controls the engine intake valve 106 and the engine exhaust valve 108 in a low valve lift HCCI mode 142. When a transition is required, the processor 116 controls the engine intake valve 106 and the engine exhaust valve 108 in a low valve lift SI mode 144. The processor 116 then controls the engine intake valve 106 and the engine exhaust valve 108 in a high valve lift SI mode 146.

By incorporating the low valve lift SI modes 138/144, smooth transitions between the two combustion modes are enabled by decoupling the valve-switching dynamics from the combustion mode switching dynamics. This decoupling simplifies the control problem by relegating the valve lift profile switch to happen during pure SI combustion. The control approach for the combustion mode switch is based on designating three operational modes for the controller 126/estimator 122. A first operational mode is depicted in FIG. 7.

Figure 7:
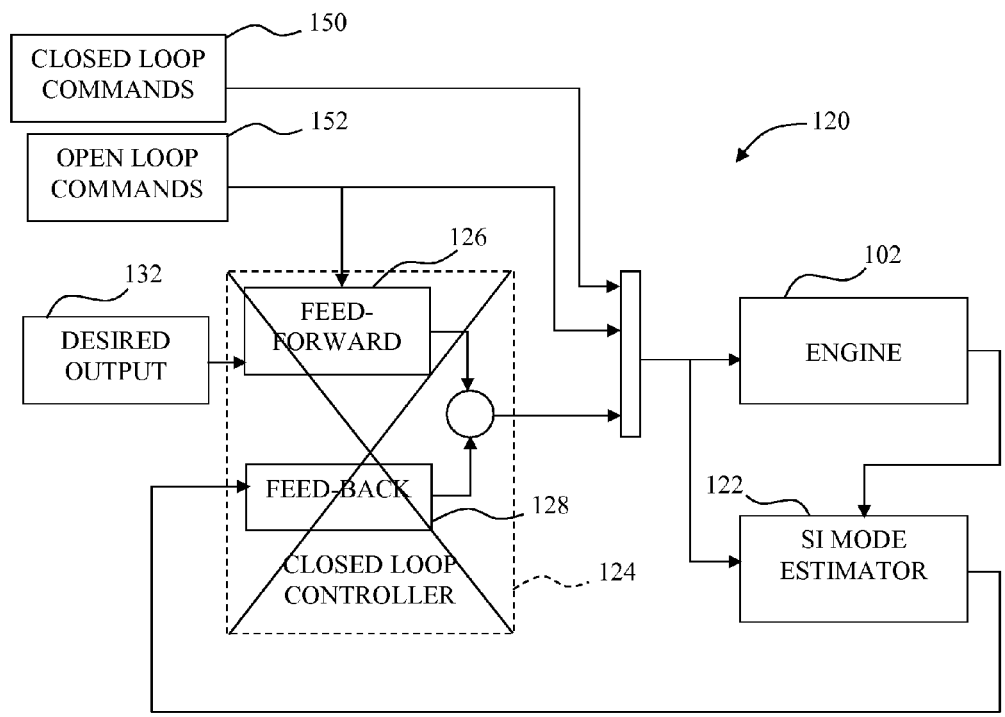
FIG. 7 depicts the control structure of FIG. 4 operating in an SI operational mode.

In FIG. 7, the system 120 functions in an SI mode and the estimator 122 functions as an SI mode estimator, and SI closed-loop commands 150 along with open-loop commands 152 are used to control the engine 102 in SI mode. In this configuration, the controller 124 is not active as indicated by the "X" mark. Nonetheless, the SI estimator 122 is used to obtain an estimate of states based on measurements such as the phasing of combustion. These estimates are fed to the HCCI controller when it is turned on during the transition mode.

Figure 8:
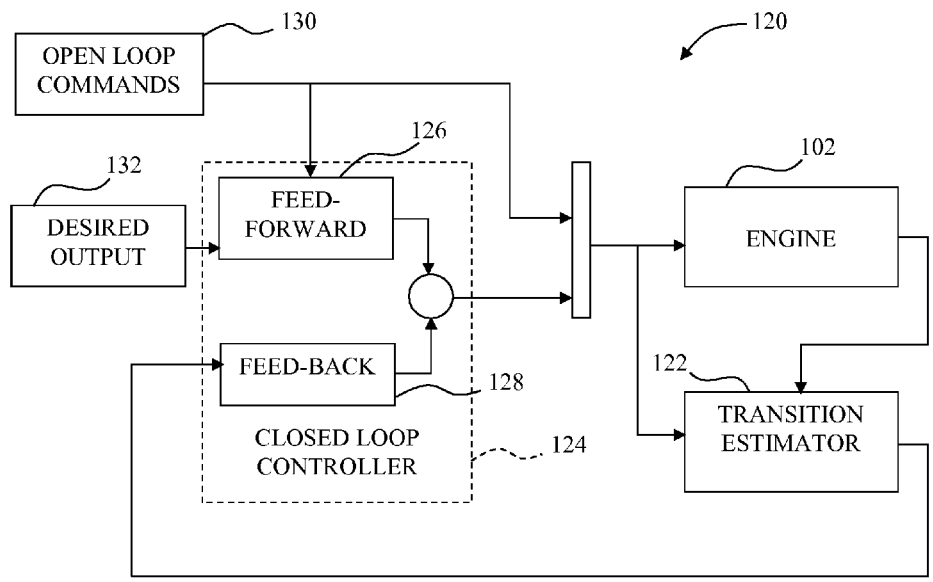
FIG. 8 depicts the control structure of FIG. 4 operating in a transitional operational mode.

The transition mode is depicted in FIG. 8 wherein the estimator 122 functions as a transition mode estimator. The command structure 120 function in the transition mode is otherwise similar to the function of the command structure described above with respect to FIG. 4. The transition mode controls are determined based on estimates of key states such as the mixture temperature or residual mass. Outputs that are controlled during the transition include the phasing of combustion and the work output on each engine cycle. The estimator 122 for this mode has elements of both the SI and HCCI estimators (see below), since combustion happens primarily through flame propagation (SI), but the HCCI-like actuation leads to auto-ignition on the next cycle. In one embodiment, the transition mode lasts for a single cycle.

Figure 9:
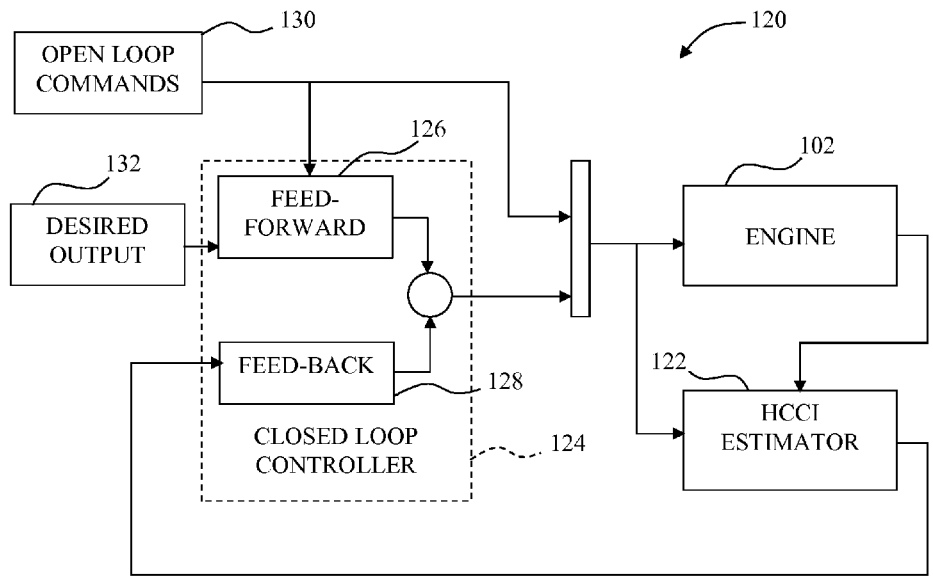
FIG. 9 depicts the control structure of FIG. 4 operating in an HCCI operational mode.

The final operational mode is an HCCI mode depicted in FIG. 9. In FIG. 9, the estimator 122 functions as an HCCI mode estimator. The command structure 120 function in the HCCI mode is otherwise similar to the function of the command structure described above with respect to FIG. 4. In this mode, the HCCI closed-loop controller 124 is used to control inputs such as the timing of fuel injection in order to track a desired work output and combustion phasing of the engine 102.

The closed-loop controller 124 in one embodiment is designed based on a control-oriented model of HCCI as discussed more fully below. A primary closed-loop control input is the fuel injection timing, since it can be used as a cycle-by-cycle and cylinder-individual control knob, but other closed-loop inputs in some embodiments include valve timings, fuel quantity etc.

Figure 10A:
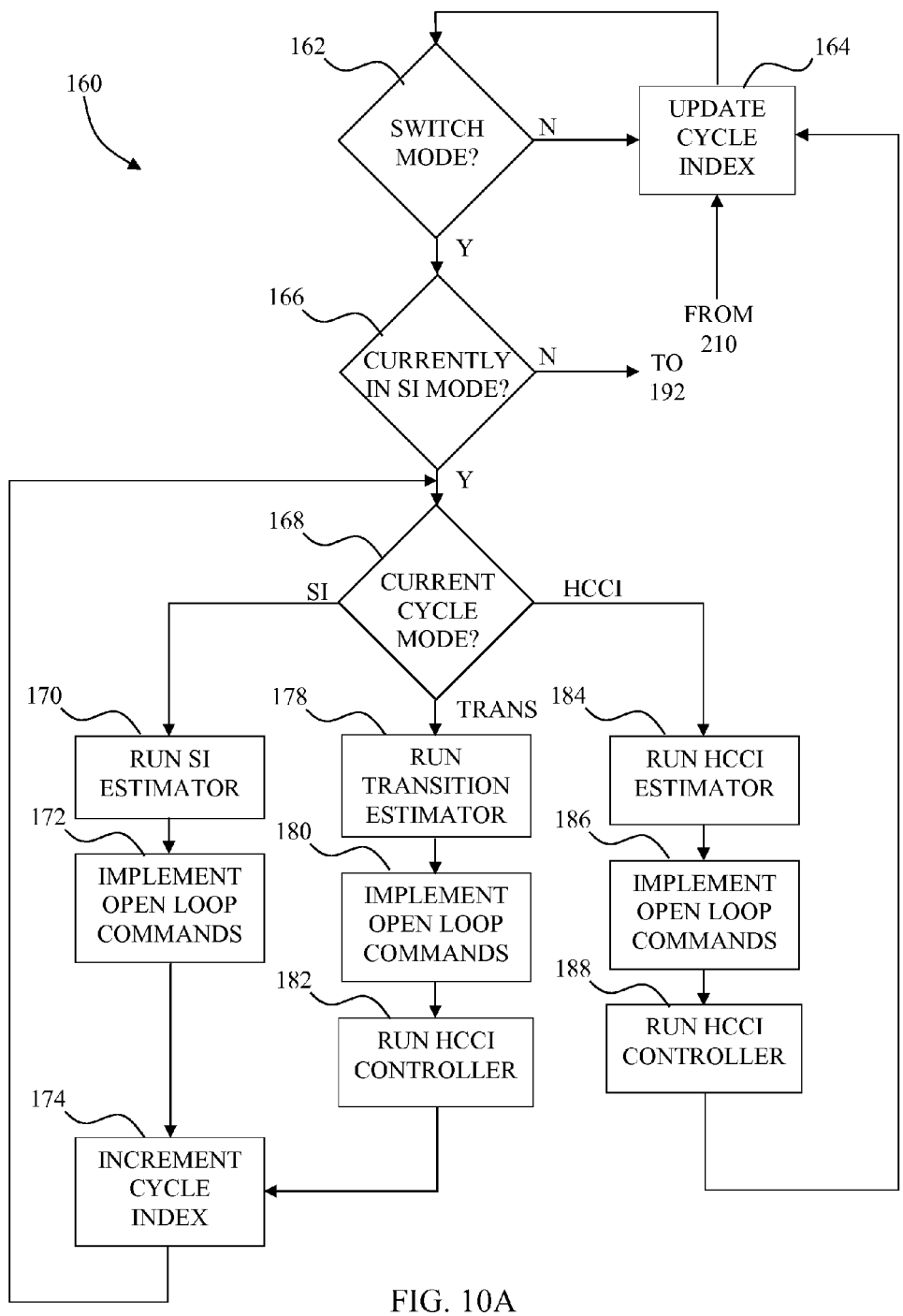
FIGS. 10A and 10B depict a process provided by the control structure of FIG. 4.
Figure 10B:
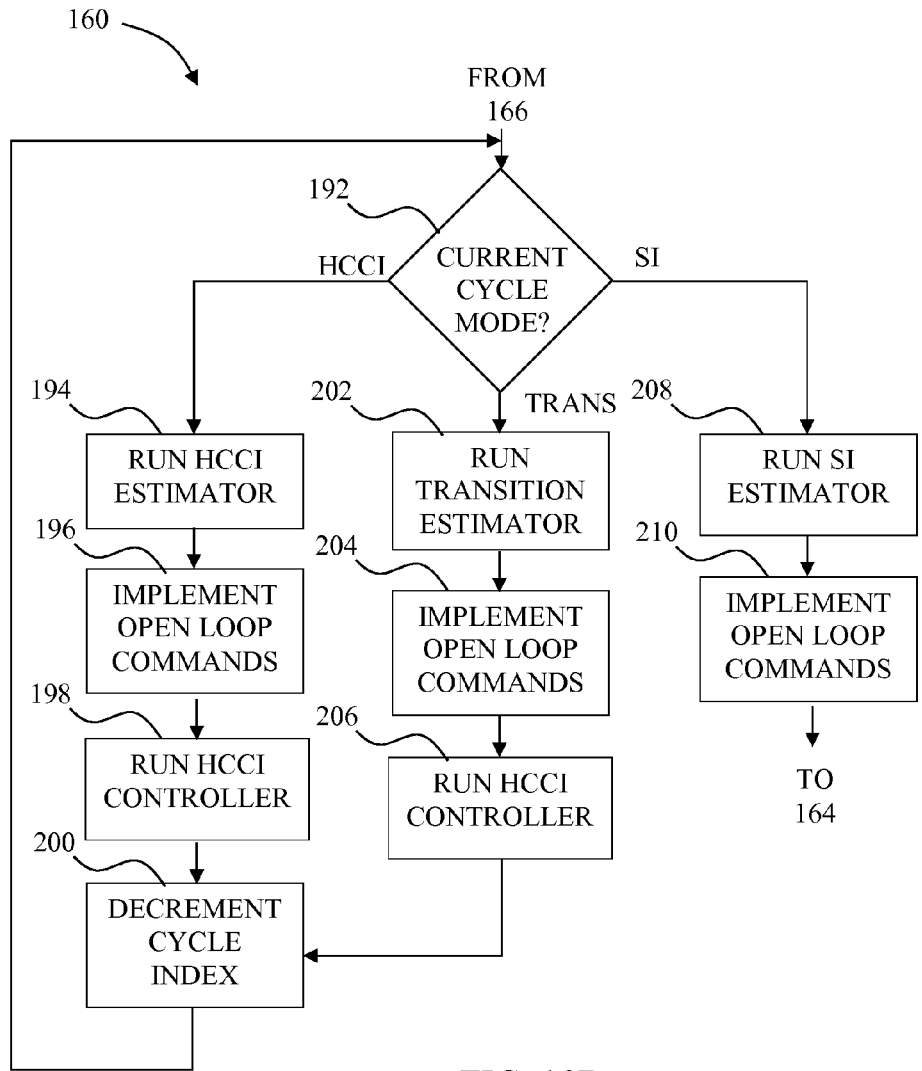

The modes shown in FIGS. 7-9 are implemented by the processor 116 based upon a process 160 depicted in FIGS. 10A and 10B. The controller 124 and estimator 122 are updated once every engine cycle, typically after the combustion process, once an estimate of key measurements since as combustion phasing are made available. The controller 124 checks for a command to switch modes. The command to switch modes is generated by the processor 116 based upon various inputs such as current mode, engine output and desired engine output as indicated, for example, by a gas pedal position. If no mode switch has been commanded at block 162, the process continues to block 164 and awaits a command to switch.

If a command to switch modes is issued when checked at block 162, then the process proceeds to block 166 and the processor 116 determines if the engine 102 is currently being controlled in SI mode. If so, the process 160 proceeds to block 168 and the current mode is checked. Since the mode has not been switched, the system is still in SI mode so the process continues to block 170 and the SI estimator is run to estimate the states. The closed-loop switch controller is kept off. Open-loop inputs for the transition sequence are initiated at block 172 (along with any closed-loop inputs necessary to maintain stoichiometry and torque neutrality in SI). These open-loop inputs in some embodiments include inputs such as the valve timings, throttle position, spark timing and fuel quantity.

The process 160 then proceeds to block 174 where the cycle index is incremented and the process continues to block 168. Because the cycle has been indexed at block 174, the current mode at block 168 this time is transition mode. Accordingly, the process continues to block 178 and the transition estimator is run to update the states based on the current measurement, and the last available state estimate (from the SI estimator). The updated state estimate is used by the closed-loop switch controller to command certain closed-loop inputs in addition to the open-loop inputs with the valves 106/108 at a low valve lift at block 180. A primary closed-loop control input is the fuel injection timing, but other closed-loop inputs in some embodiments include valve timings, fuel quantity etc.

At block 182, the HCCI controller is run followed by incrementing of the cycle index (block 174) to the next mode which is HCCI mode. The process then continues to block 168.

Because the cycle has been indexed for a second time at block 174, the current mode at block 168 is HCCI mode. Accordingly, the process continues to block 184 and the HCCI estimator is run to update the states based on the current measurement and the last available state estimate (from the Transition estimator). The updated state estimate is used by the closed-loop switch controller to command certain closed-loop inputs in addition to the open-loop inputs at block 186. A primary closed-loop control input is the fuel injection timing, but other closed-loop inputs in some embodiments include valve timings, fuel quantity etc. At block 188, the HCCI controller is run. The process then continues to block 164 and awaits a new mode switch command.

If at block 166 the engine is not being controlled in SI mode, then the mode switch is from HCCI mode to SI mode which is similar to the above described switch. In general, the process continues to block 192 (FIG. 10B). Since the mode has not been switched, the system is still in HCCI mode so the process continues to block 194 and the HCCI estimator is run. At block 196, open-loop commands are implemented and the HCCI controller is run at block 198.

The process 160 then proceeds to block 200 where the cycle index is decremented and the process continues to block 192. Because the cycle has been decremented at block 200, the current mode at block 192 is transition mode. Accordingly, the process continues to block 202 and the transition estimator is run. At block 204, open-loop commands are implemented and a transition cycle is executed with the valves 106/108 at a low lift. At block 206, the HCCI controller is run followed by decrementing of the cycle index (block 200) to the next mode which is SI mode. The process then continues to block 192.

Because the cycle has twice been decremented at block 200, the current mode at block 192 is SI mode. Accordingly, the process continues to block 208 and the SI estimator is run. In some embodiments, bock 208 is omitted since the states are not needed for SI operation and new states will be generated during the switch to HCCI mode at block 170. In either event, at block 210, open-loop commands are implemented and an initial SI cycle is executed. The process then continues to block 164 and awaits a new mode switch command.

In the above described process 160, the SI estimator in some embodiments is based on a model of SI combustion that captures key characteristics of this combustion mode, and relates measurements such as combustion phasing and work output to states such as mixture temperature and reactant concentrations. The HCCI estimator in some embodiments is based on a model of HCCI combustion that captures key characteristics of this combustion mode, and relates measurements such as combustion phasing and work output to states such as mixture temperature and reactant concentrations. The transition estimator includes portions of both the SI and HCCI estimators, since the transition cycle has an SI-like combustion, but the actuation during the rest of the cycle produces HCCI combustion on the following cycle. Therefore the portion of the estimator that updates the states based on the measured combustion parameters (such as combustion phasing) is taken from the SI estimator, while the portion that relates to the applied inputs is taken from the HCCI estimator. If for example, a Kalman filter is used, the measurement update is based on the SI estimator, while the time update is based on the HCCI estimator.

The determination of when to switch the controller to the transition cycle is done in any acceptable manner. In some embodiments, a temperature threshold is set beyond which auto-ignition is likely to happen, and once the estimated state temperature crosses this threshold, the transition cycle mode estimator is initiated. In some embodiments, the determination is based on the quantity of trapped exhaust, exhaust valve timing, or other such indicators.

During the process 160, the engine cycles need not follow either pure SI or pure HCCI combustion. In some embodiments, some intermediate cycles during the transition exhibit both flame propagation and auto-ignition (e.g., combustion modes such as spark-assisted compression ignition, SACI). However the controller/estimator operates either in an SI mode, an HCCI mode, or a transition cycle mode. In some embodiments, the controller/estimator further operates in a SACI mode, along with Transition cycle modes defined between SI and SACI, and SACI and HCCI. Accordingly, the controller/estimator operation on any given cycle depends on which mode that cycle is in.

As noted earlier, when the engine moves between SI and HCCI mode, there are two main control problems. The first control problem is to maintain stoichiometry in SI mode (to maximize three-way catalyst conversion efficiency) while the valves are ramping between their SI and HCCI positions by controlling the throttle position. In the embodiment of FIG. 3, the stoichiometry control problem, which essentially deals with the gas exchange dynamics, is addressed in any desired manner.

The second control problem, is the maintenance of desirable combustion phasing and constant load during the transition from SI to HCCI. This control problem, which is addressed by the process 160, is directed to the combustion dynamics in the cylinder 104 and is thus directed to valve timings, throttle position, and spark timing which are all commanded in open-loop during the transition. The ramp rate for the valves is set at a fixed value based on expected electric cam-phaser ramp rates (about 12 CAD/cycle at 2000 rpm).

Figure 11:
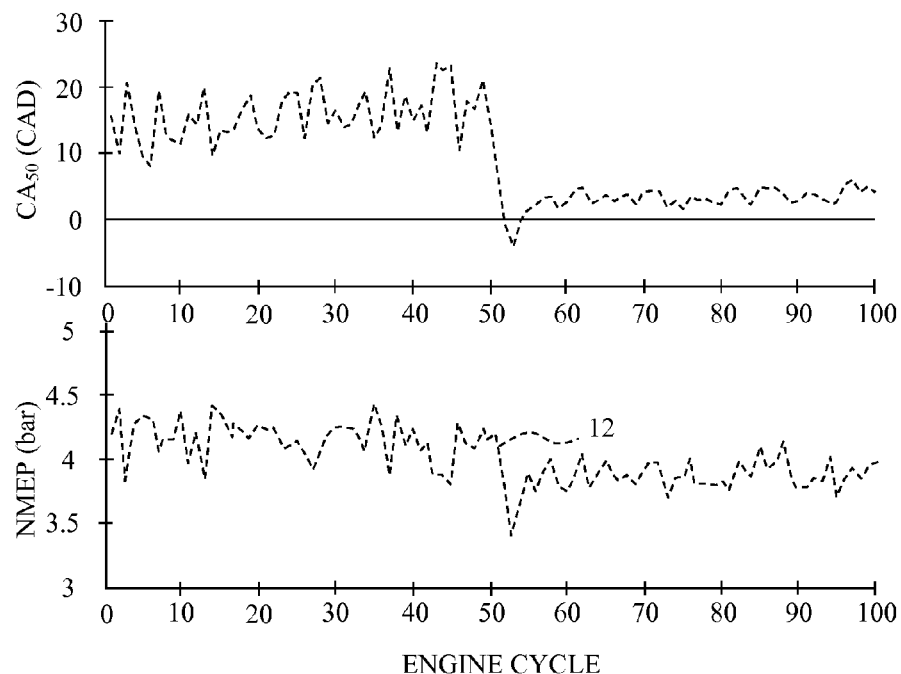
FIG. 11 depicts the $CA_{50}$ and NMEP resulting from a switch from SI to HCCI mode using an open-loop controller.

In prior systems, simply using a 12 CAD/cycle ramp rate in open-loop control results in undesired dynamics. For example, FIG. 11 depicts the work output, which is expressed as net mean effective pressure (NMEP), as a function of the engine cycle for an open-loop transition between the steady-state SI and HCCI conditions with valve positions ramped at a rate of 12 CAD/cycle starting on cycle 45. Cycle 50 is the first cycle with auto-ignition. The fuel injection on the first two HCCI cycles was maintained at a late timing in order to compensate for the higher temperature of SI exhaust (which would advance the combustion phasing); subsequently the injection timing was set early to maintain stable combustion. As is evident from FIG. 11, there are some undesirable dynamics during the transient. For example, some cycles have very early combustion phasing (before top dead center or "TDC"), which leads to a sharp drop in the NMEP. The early phasing also leads to significant ringing.

Consequently, in the embodiment of FIG. 4, the closed-loop controller 124 is implemented to track a desired phasing by controlling the fuel injection timing on a cycle-by-cycle basis in order to maintain constant NMEP and prevent cycles with very early combustion phasing. Fuel injection timing is used as the primary control input for combustion phasing for various reasons. One reason is that the injection timing has a strong influence on combustion phasing through fuel reactions during the recompression phase. Additionally, fuel injection can be used as a cycle-by-cycle as well as cylinder-individual control input on a multi-cylinder engine, while inputs such as the valve timings are set for all cylinders based on the cam-phaser position.

Accordingly, the program instructions stored within the memory 114 provide a transition from throttled SI mode operated with low-lift valves to un-throttled HCCI mode also with low-lift valves. Therefore the dynamics of switching a dual-cam-phaser system from high to low lift are decoupled from the dynamics of switching from SI to HCCI mode, which simplifies the transition process. The mode switch from SI to HCCI described above with respect to the process 160 thus follows the following sequence under the control of the processor 116 executing program instructions in the memory 104:

1. The throttle 112 is opened to the wide open position.
2. The intake and exhaust valves (106/108) are ramped over several cycles from the steady-state SI position to the HCCI position. The ramp-rate is fixed based on the maximum allowable ramp-rate for a desired electric cam-phaser system.
3. When the valves 106/108 are close to the HCCI position, the fuel injection quantity and timing are switched from the SI to the HCCI values, and the spark plug 110 is turned off.

Figure 12:
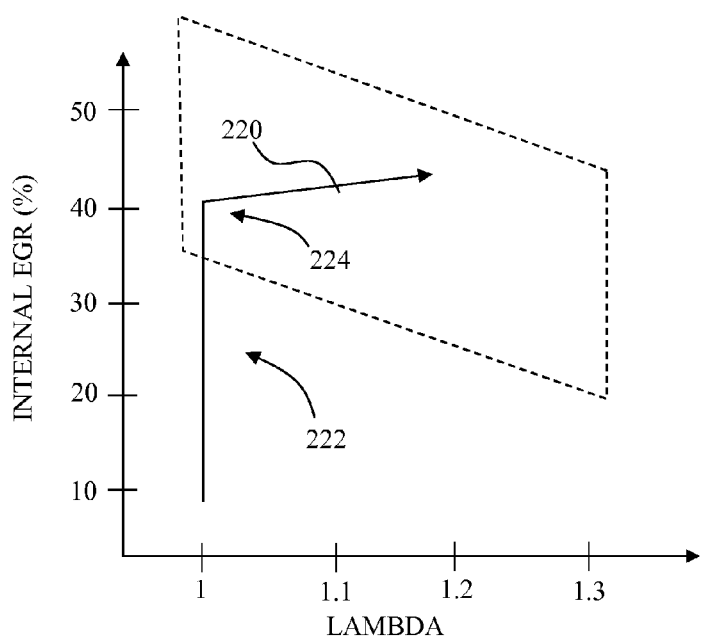
FIG. 12 depicts a chart showing a transition from SI to HCCI mode in terms of the internal EGR fraction and Lambda.

The resulting transition is shown schematically in FIG. 12. In FIG. 12, the processor 116 is initially controlling the engine 102 in an SI mode. In SI mode, lambda, which represents the ratio of the actual air-fuel ratio to the stoichiometric air-fuel ratio, and the fraction of internal exhaust gas recirculation (EGR) or trapped exhaust mass, typically runs stoichiometric (lambda=1) and with low internal EGR. SI mode is usually controlled with the throttle partially closed (to maintain stoichiometry) and with high-lift cams operating the intake and exhaust valves (to maximize flow).

HCCI mode, in contrast, is usually run lean (lambda>1) and with high internal EGR. HCCI mode is thus controlled with the throttle 112 fully open (thereby minimizing pumping losses) and with low-lift cams operating the valves 106/108 (to enable adequate trapping of residuals in the cylinder 104.

For the transition from SI mode indicated by operating parameters line 220 in FIG. 12, the processor 116 controls the throttle 112 open while the engine intake valve 106 and the engine exhaust valve 108 are ramped. Accordingly, stoichiometry is maintained while increasing the rate of internal EGR in region 222 of operating parameters line 120. Once the EGR has risen to the region 224 of operating parameters line 220, there is sufficient EGR to enable auto-ignition. The processor 116 thus initiates the mode switch to HCCI.

Table 1 shows the steady-state operating conditions in SI and HCCI for one such mode switch at an engine speed of 2000 rpm, and load of 4 bar NMEP on a single-cylinder engine.

TABLE 1

| Parameter | SI | HCCI |
| --- | --- | --- |
| IVC (CAD at 0.5 mm lift) | 509 | 570 |
| EVC (CAD at 0.5 mm lift) | 315 | 260 |
| Valve duration (CAD at 0.5 mm lift) | 111 | 111 |
| Valve lift (mm) | 4 | 4 |
| Intake pressure (bar) | 0.74 | 1 |
| Fuel mass injected (mg/cycle) | 15.4 | 13.7 |
| SOI (CAD) | 381 | 355 |
| Spark timing (CAD) | 645 | — |

The data in Table 1 represents an operating condition towards the higher end of the HCCI operating range (e.g., point 18 of FIG. 1), where a mode switch to SI would likely be needed. All crank angles are referenced to 0 CAD at the Top Dead Center (TDC) position during combustion.

Table 1 revels that the intake valve 106 and exhaust valve 108 closing positions (IVC and EVC) in SI mode provide a valve timing profile with a relatively small amount of negative valve overlap (NVO). In HCCI mode, however, the HCCI valve timing profile provides a significant NVO and therefore trapped residual mass. Due to throttling, the intake air pressure is lower than atmospheric pressure in SI mode, while HCCI is un-throttled and thus at a higher pressure.

Additionally, less fuel is injected in HCCI for the same load due to the higher efficiency of HCCI mode. The fuel is also injected much earlier in HCCI mode as compared to SI mode, as represented by the Start-of-Injection timing (SOI). In fact, in HCCI mode fuel is injected during the recompression process, where the high pressure and temperature conditions enable partial reaction of the fuel. These recompression reactions then influence the phasing of combustion on the subsequent engine cycle.

Figure 13:
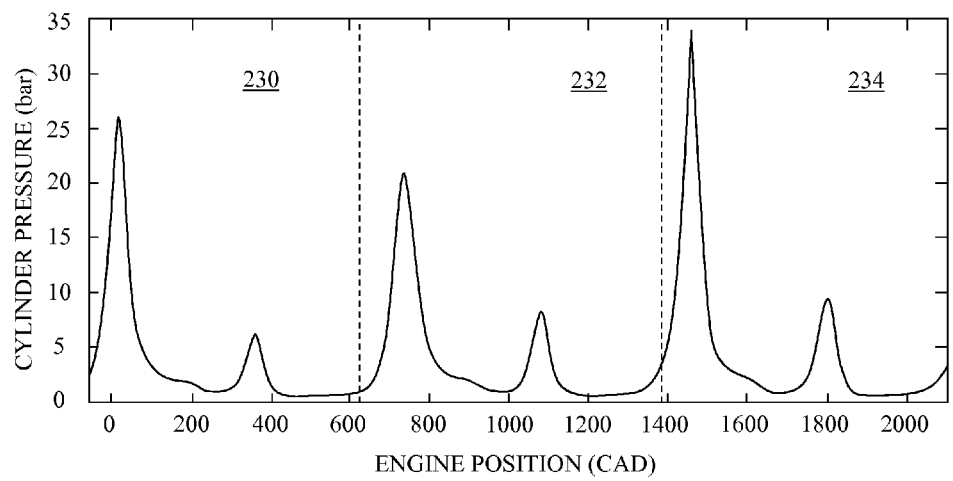
FIG. 13 depicts a plot showing cylinder pressure during the transition from SI mode to HCCI mode.

The pressure within the cylinder 102 during the above described mode shift is depicted in FIG. 13. FIG. 13 includes a first region 230 of the pressure while operating in SI mode. When operating in SI mode, the controller 124 is turned off. The estimator 122 which is based on a linearized SI model (discussed more fully below) computes a cycle-by-cycle estimate of the oxygen and temperature states. This provides the feedback function 128 the most up-to-date state estimate when the controller 124 is turned on.

A region 232 in FIG. 13 depicts the pressure in the cylinder 104 during transition mode. This cycle is the last cycle with SI combustion. The estimator 122 is still in operation since the combustion on this cycle is dominated by flame propagation and not auto-ignition. On this cycle, the controller 124 is turned on. The feed-forward function 126 and the feedback function 128 are thus operating, both of which incorporate a linearized HCCI model discussed in more detail below. The feedback control input is based on the latest SI state estimate, while the feed-forward input is based on the desired $CA_{50}$ for the next (HCCI) cycle. This mode is operational just for this one cycle.

A region 234 in FIG. 13 depicts the HCCI cycle immediately succeeding the transition cycle. In this mode both the controller 124 and estimator 122 are based on the linearized HCCI model.

Figure 14:
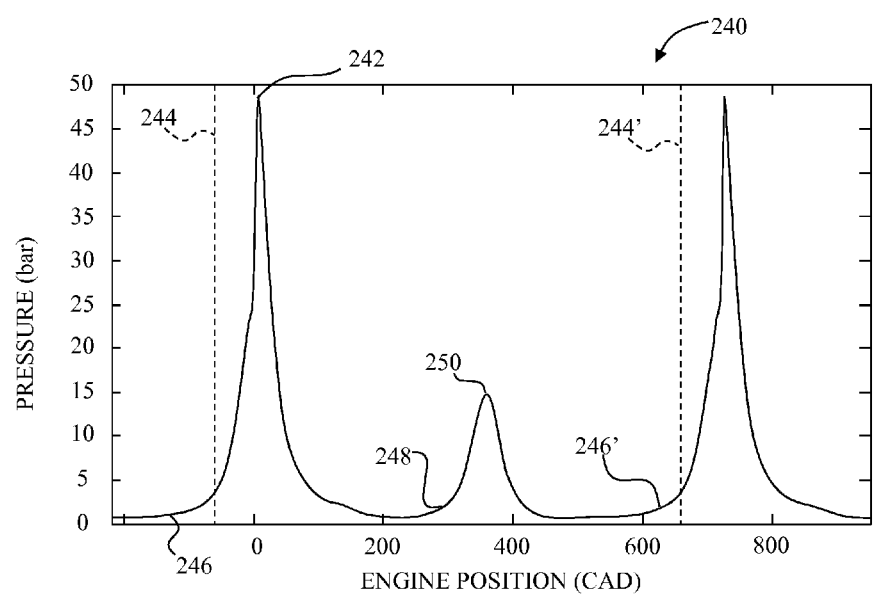
FIG. 14 depicts a chart showing an overview of a nonlinear model for control of switching between operational modes.

The linearized mode switch algorithm stored in the memory 114 and executed by the processor 116 in one embodiment is based upon a control-oriented model of HCCI described by Ravi et al., "Model based control of HCCI engines using exhaust recompression", *IEEE Transactions on Control Systems Technology*, 18, 2010, pp. 1289-1302. The Ravi model is a discrete-time nonlinear model, which captures HCCI dynamics on a cycle-by-cycle basis. FIG. 14 shows a graphical summary of the nonlinear model 240 with reference to a typical in-cylinder pressure trace during HCCI. The primary output of the nonlinear model is the phasing of combustion, $CA_{50}$ at point 242. The inputs considered for controlling the combustion process are the fuel quantity and injection timing, as well as the intake and exhaust valve timings.

The states of this nonlinear model at point 244 are given by:

$$x = [[O_2]_s, T_{s[f]_s} V_{IVC} K_{th}]^T \qquad (1)$$

The states are defined at a fixed location $\theta_s$ after IVC (input at point 246) during the compression stroke, in this example $\theta_s = -60$ CAD (60 CAD before TDC-combustion). $[O_2]_s$ and $[f]_s$ represent the oxygen and fuel concentrations, respectively, and $T_s$ represents the mixture temperature. $V_{IVC}$ is the cylinder volume at IVC. The final state $K_{th}$ is a state that captures the effect of the fuel injection timing on combustion phasing through an Arrhenius reaction rate integral, as described by Ravi, et al., "Modeling and control of exhaust recompression hcci: Split fuel injection for cylinder-individual combustion control", *IEEE Control Systems Magazine*, 32, 2012, pp. 26-42.

The relationships between the states on a particular engine cycle and $CA_{50}$, as well as the states on the next cycle are obtained by breaking down a single HCCI cycle into several distinct processes, each of which can be modeled with simple thermodynamic assumptions. Compression and expansion are assumed to be polytropic; a finite-duration combustion process is assumed with a fraction of the heating value of the fuel being lost to heat transfer; the exhaust process is modeled with an instantaneous blowdown followed by a volume-based mass transfer to the exhaust manifold; the induction model assumes hydrodynamic equilibrium with the intake manifold and an instantaneous mixing between air, trapped exhaust and fuel at IVC; and an integrated Arrhenius model is used to capture ignition.

Stepping through the above processes gives a five state nonlinear state space model shown in equation 2 below:

$$x_{k+1}=F_{HCCI}(x_k,u_k)\ y_k=G_{HCCI}(x_k) \quad (2)$$

The state vector x is given in equation (1), the output y is $CA_{50}$ and the input vector u is given by:

$$[m_f V_{EVC} V_{IVC} u_{th}]^T$$

where $m_f$ is the mass of fuel injected (input at point 250), $V_{EVC}$ and $V_{IVC}$ are the cylinder volumes at exhaust valve closing (input at point 248) and intake valve closing (point 246), and $u_{th}$ corresponds to the SOI input at point 250 as described by Ravi, et al., "Modeling and control of an exhaust recompression hcci engine using split injection", *Journal of Dynamic Systems, Measurement, and Control*, 2012, 134. The inputs and states are updated each cycle as represented by the intake valve closing point 246' and the model update 244'.

This nonlinear model was extended for SI combustion by replacing the Arrhenius-based ignition model with an empirical model for ignition as a function of the spark timing, which serves as a direct control knob for phasing in SI.

$$\theta_{SOC}=a_1\theta_{spk}+a_2 \quad (3)$$

In equation 3, $\theta_{SOC}$ represents the start of combustion location and $\theta_{spk}$ represents the spark timing. The second quantity has an important effect on SI combustion since inert residual slows down the flame propagation and lengthens the burn duration. The duration of combustion can also be parameterized from experimental data as a function of the start of combustion and the internal EGR rate, as shown in the following equation:

$$\Delta\theta_{SOC}=b_1\theta_{SOC}+b_2 EGR+b_3$$

The other components of the control-oriented nonlinear model are essentially identical between SI and HCCI, though parameters such as the polytropic exponents are different and are tuned based on experimental data. The nonlinear model can be represented as $$x_{k+1}=F_{SI}(x_k,u_k)\ y_k=G_{SI}(x_k,u_k) \quad (5)$$

The states and output are the same as the HCCI model, but the input vector is given by $$[m_f V_{EVC} V_{IVC} \theta_{spk}]^T$$

wherein the spark timing replaces the injection timing input. Also, the output equation now has a direct feed-through term since the spark timing input directly influences the combustion phasing.

In order to simulate a mode switch with the SI and HCCI control models, the two nonlinear models are tuned to the respective steady-state conditions and then "stitched" together during the transition. The last cycle before auto-ignition occurs is defined as the transition cycle; therefore after SI combustion on this cycle, the model is switched to HCCI mode, and the rest of this cycle is run with HCCI parameters.

In the embodiment of FIG. 4, the nonlinear model described above is linearized around the steady-state SI and HCCI operating points before and after the mode switch. The linearization is performed numerically, with linear expressions being taken for any quantity $a_k$ of the form:

$$a_k=\bar{a}_k(1+\tilde{a}_k) \quad (6)$$

where $\bar{a}_k$ represents the value of the quantity a at the nominal operating condition, and $\tilde{a}_k$ represents the normalized deviation from that operating point. The linearized SI and HCCI models are given by $$\tilde{x}_{k+1}=A_{SI}\tilde{x}_k+B_{SI}\tilde{u}_k\ \tilde{y}_k=C_{SI}\tilde{x}_k+D_{SI}\tilde{u}_k \quad (7)$$

$$\tilde{x}_{k+1}=A_{HCCI}\tilde{x}_k+B_{HCCI}\tilde{u}_k\ \tilde{y}_k=C_{HCCI}\tilde{x}_k \quad (8)$$

where $A_{SI}$, $B_{SI}$, $C_{SI}$, $D_{SI}$, $A_{HHCI}$, $B_{HCCI}$, and $C_{HCCI}$ are matrices that are functions of the respective linearization points.

It should be noted that the states, inputs and outputs in the above two sets of equations are normalized values around the respective nominal operating points. Since the nominal operating points are different in SI and HCCI, the normalized value of the same absolute state, input, or output would be different in SI and HCCI. The linearization points used for an exemplary control design were conducted at the 4 bar NMEP, 2000 rpm operating point described earlier in Table 1.

The processor 116 in the embodiment of FIG. 3 uses a Kalman filter structure to estimate the state in all three operational modes. The measurement of $CA_{50}$ is available shortly after combustion, before the control input (injection timing) on that cycle is determined. Consequently, the current estimator form of the Kalman filter is used. When in SI or Transition cycle modes, the time and measurement updates have the following forms respectively:

$$\hat{x}_{(k|k-1)}=A_{SI}\hat{x}_{(k-1|k-1)}+B_{SI}\tilde{u}_k\ \hat{x}_{(k|k)}=$$
$$\hat{x}_{(k|k-1)}+M_{SI}(y_k-C_{SI}\hat{x}_{(k|k-1)}-D_{SI}\tilde{u}_k) \quad (9)$$

where $M_{SI}$ is the correction gain of the Kalman filter. The controller 124 uses the current state estimate, given by $\hat{x}_{(k|k)}$ (estimate on cycle k given measurement on cycle k). It should be noted that such a setup only works when there is no direct feed-through of a controlled input to the measured output (since otherwise an algebraic loop would be created). For the current mode switch model, since the only input that is fed-through is the spark timing, which is not controlled in closed-loop by the feedback controller, this is not a problem.

A similar expression is obtained based on the HCCI model, which is used when in HCCI mode:

$$\hat{x}_{(k|k-1)}=A_{HCCI}\hat{x}_{(k-1|k-1)}+B_{HCCI}\tilde{u}_k\ \hat{x}_{(k|k)}=$$
$$\hat{x}_{(k|k-1)}+M_{HCCI}(y_k-C_{HCCI}\hat{x}_{(k|k-1)}) \quad (10)$$

It should be noted that since the state estimates generated by each of these estimators are normalized around different nominal operating points, a renormalization needs to be conducted when handing the state estimate off from the SI to the HCCI estimator after the transition cycle.

The closed-loop controller is based on the linearized HCCI model. The feedback input is based on the current state estimate obtained from the estimator, and an LQR control gain. The feed-forward input is determined by a reference input control structure such as the one described by Franklin, et al., "Feedback Control of Dynamic Systems", 3rd edition ed. Addison Wesley Publishing Company, 1994, and is based on the desired $CA_{50}$ and the open-loop inputs. An integral component based on the $CA_{50}$ error is added to ensure that the phasing converges to the desired value after the transient.

The control input is then given by:

$$\tilde{u}_k = -K_{LQR}\hat{x}_{(k|k)} + (N_u + K_{LQR}N_x)r_k + K_I\Sigma_i(y_i - r_i) \quad (11)$$

where $r_k$ is the reference input (representing the desired $CA_{50}$), $K_{LQR}$ is the feedback control gain, $K_I$ is the integral gain and $N_u$ and $N_x$ are feed-forward matrices obtained from the constraint that the linear system respond with a zero steady state error to any constant input.

The control strategy executed by the processor 116 was tested on a single-cylinder HCCI engine with a compression ratio of 11:1. The intake and exhaust valves (two each) were controlled by an electro-hydraulic variable valve actuation (VVA) system that allows fully flexible actuation of the valves on each cycle. The system was used to emulate a cam-phaser, and so a constant valve profile was maintained, with only the timing of fuel injection being modified. The engine was equipped with a direct injection system. In-cylinder pressure was measured using a Kistler piezoelectric pressure transducer. All tests presented here were run with a valve lift of 4 mm on both the intake and exhaust. The fuel injection pressure was set at 60 bar and the engine coolant temperature was held constant at 90° C.

Figure 15:
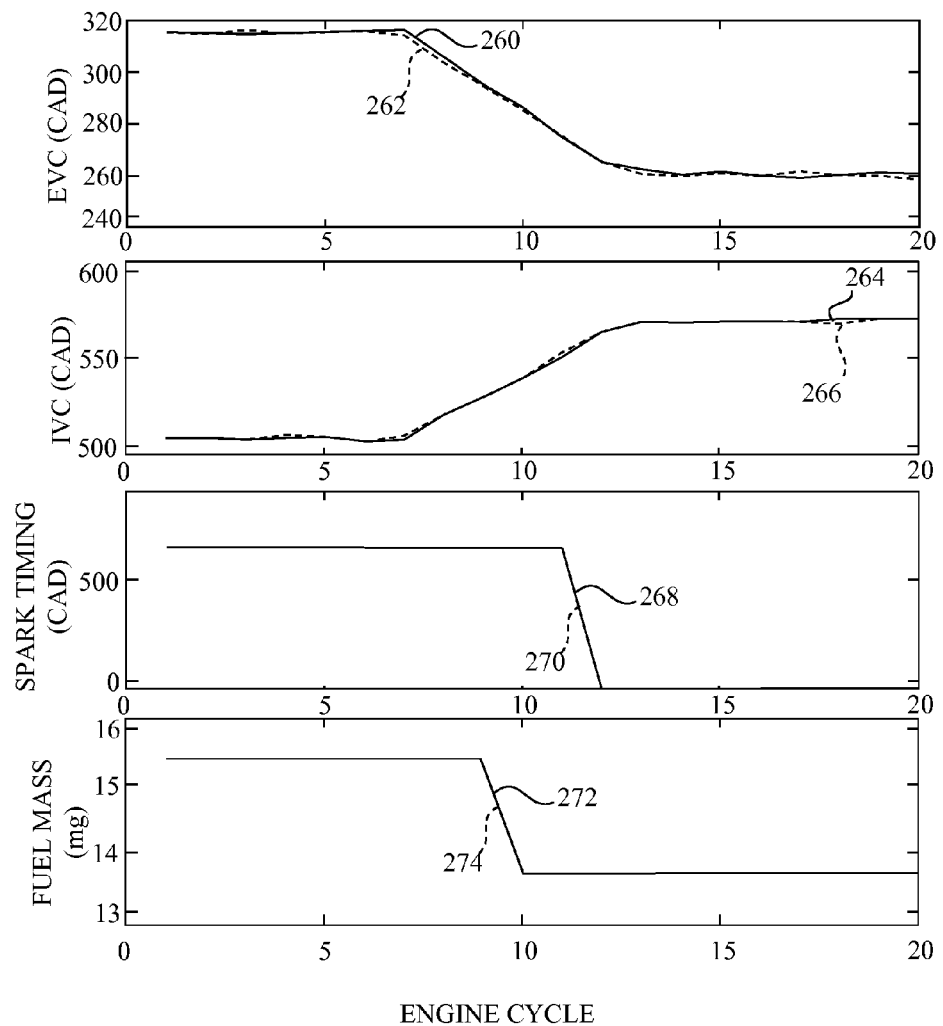
FIG. 15 depicts a plot of open-loop inputs for an open-loop and a closed-loop controller during an exemplary SI to HCCI mode switch.
Figure 16:
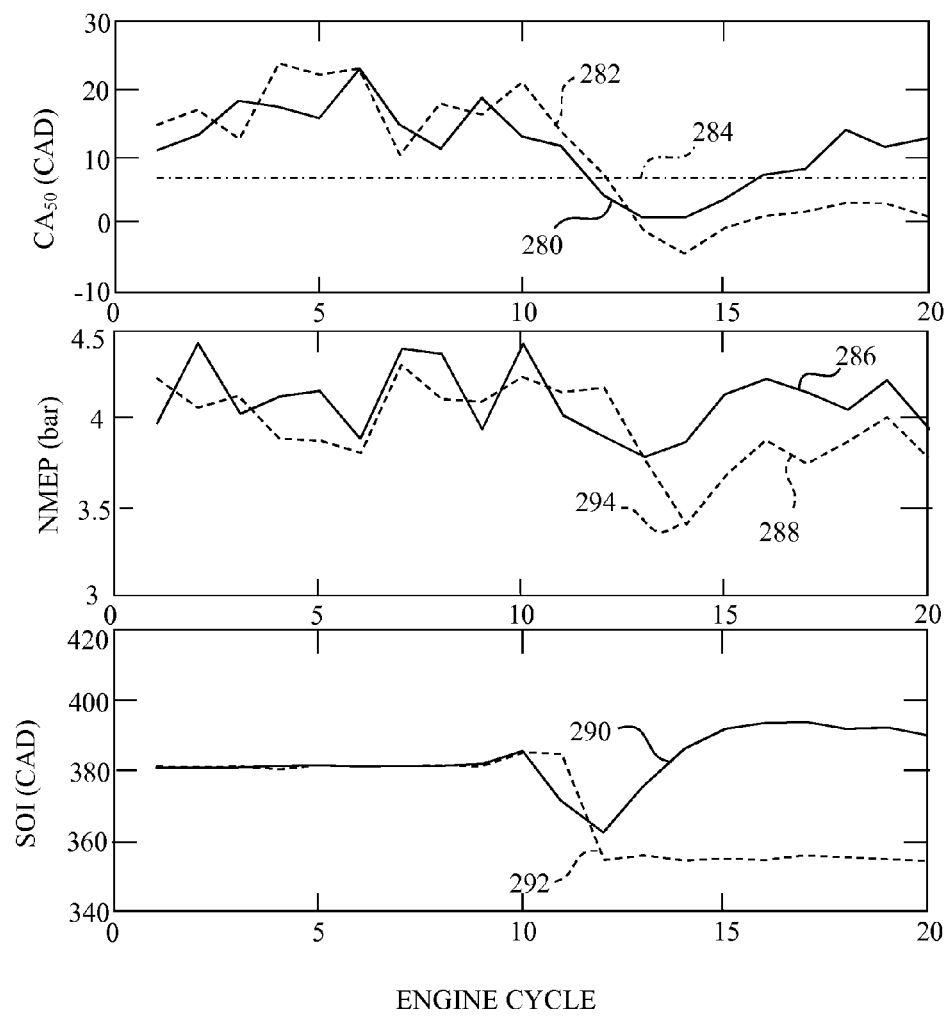
FIG. 16 depicts a plot of outputs for closed-loop and open-loop controllers during the exemplary SI to HCCI mode switch of FIG. 15.

FIGS. 15 and 16 show results of the test along with the results of an open-loop response (shown in FIG. 11) during a mode switch at 4 bar NMEP, 2000 rpm, with SI operation prior to cycle 10 and HCCI operation after cycle 11. In FIG. 15, the line 260 indicates the exhaust valve closing under closed-loop control while the line 262 indicates the exhaust valve closing under open-loop control. The line 264 indicates the inlet valve closing under closed-loop control while the line 266 indicates the inlet valve closing under open-loop control. As seen, the valve timings ramp over several cycles from their steady-state position in SI to their steady-state position in HCCI—this represents a typical ramp achievable by a production cam phaser.

Additionally, the line 268 indicates the spark plug timing under closed-loop control while the line 270 indicates the spark plug timing under open-loop control. Finally, the line 272 indicates the amount of fuel injected under closed-loop control while the line 274 indicates the amount of fuel injected under open-loop control. The spark is turned off on cycle 12, and the fuel mass is switched to a lower value (due to the higher efficiency of HCCI) on cycle 10. FIG. 15 shows that there was very little difference between the open-loop inputs and the closed-loop inputs.

FIG. 16 shows the two outputs of interest, $CA_{50}$ and NMEP, as well as the closed-loop control input, SOI (start of injection timing). FIG. 16 includes line 280 which indicates the $CA_{50}$ for closed-loop control while the line 282 indicates the $CA_{50}$ for open-loop control and the line 284 indicates the desired $CA_{50}$. Additionally, line 286 indicates NMEP for closed-loop control while the line 288 indicates the NMEP for open-loop control. Finally, line 290 indicates SOI for closed-loop control while the line 292 indicates the SOI for open-loop control.

In FIG. 16, the desired $CA_{50}$ after the mode switch was set at 7 CAD after TDC. In FIG. 16, the controller/estimator scheme runs in SI mode for cycles 1-10, is in the Transition mode on cycle 11 and in HCCI mode from cycle 12 onwards. In SI mode, there is no closed-loop control action and all inputs are commanded open-loop. The closed-loop controller is turned on during cycle 11, which is the first cycle with some auto-ignition.

Significantly, the SOI trajectory for closed-loop control (line 290) is markedly different from the open-loop command (line 292). Specifically, after two cycles of early injection that stabilize HCCI combustion, the injection timing is moved much later, thereby delaying the phasing of combustion. This delay has two important effects.

The first effect is that a sharp drop in NMEP is avoided. In contrast, the open-loop case (line 288) drops precipitously to point 294. The closed-loop control thus maintains a relatively constant work output during the mode switch (and in fact improves the overall efficiency due to the later combustion phasing).

Figure 17:
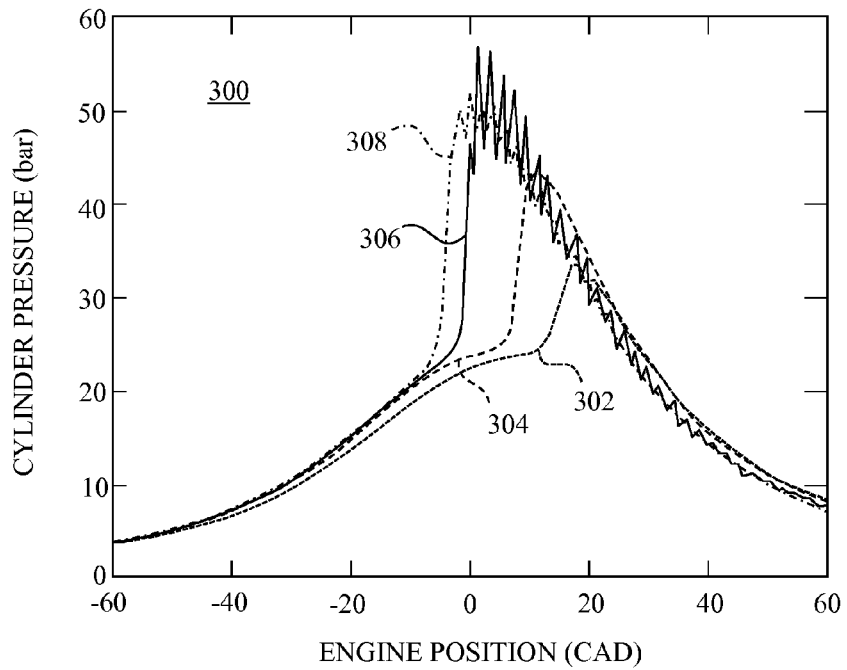
FIG. 17 depicts the cylinder pressure of the first four cycles of HCCI operation for an open-loop control system.

The second effect is that cycles with very early combustion phasing are avoided. Early combustion phasing leads to sharp drops in NMEP as well as ringing. For example, FIG. 17 depicts a chart 300 of the pressure in the cylinder over the first four cycles of HCCI operation following a switch from SI operation under an open-loop control. In FIG. 17, line 302 is the first cycle, line 304 is the second cycle, line 306 is the third cycle, and line 308 is the fourth cycle. FIG. 17 indicates ringing is occurring.

Figure 18:
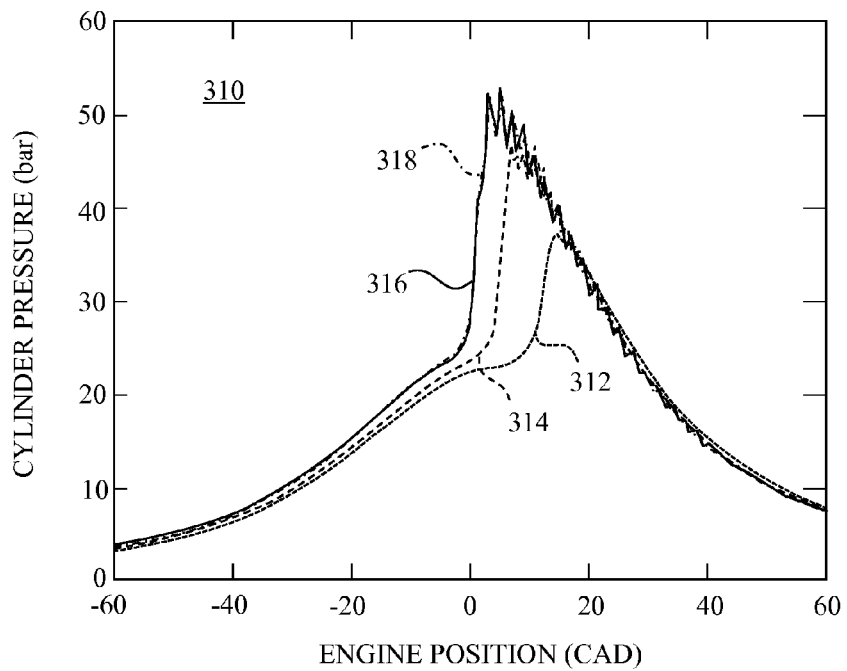
FIG. 18 depicts the cylinder pressure of the first four cycles of HCCI operation for a closed-loop control system.

FIG. 18 depicts a chart 310 of the pressure in the cylinder over the first four cycles of HCCI operation following a switch from SI operation under closed-loop control. In FIG. 18, line 312 is the first cycle, line 314 is the second cycle, line 316 is the third cycle, and line 318 is the fourth cycle. FIG. 18 indicates reduced ringing compared to FIG. 17.

Consequently, the controller 124 provides significant improvement over the response with an open-loop control. FIG. 16 does indicate an undershoot of the desired $CA_{50}$ (line 280 beneath line 284). If desired, the undershoot can be reduced with a more aggressive feedback controller, or by further introducing control of the valve timings.

Figure 19:
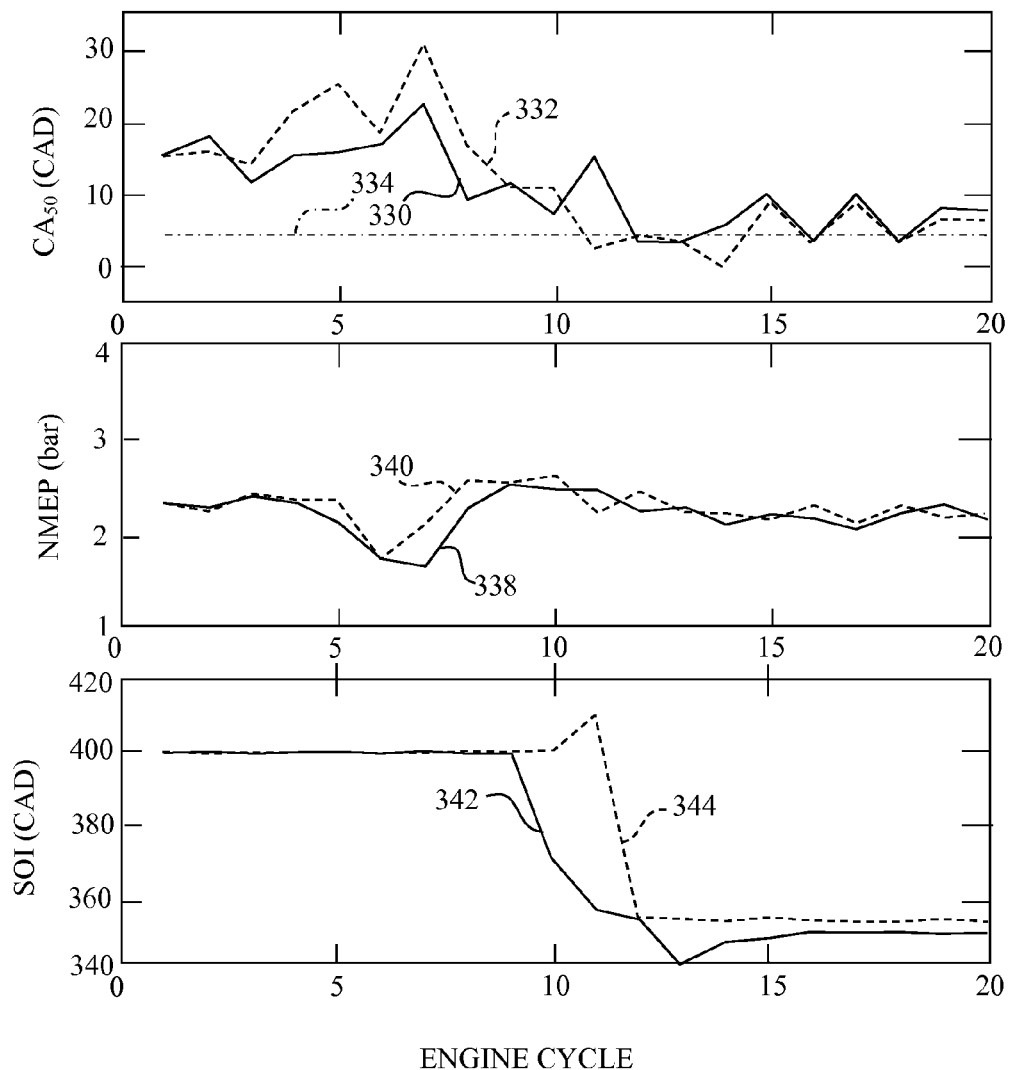
FIG. 19 depicts a plot of outputs for closed-loop and open-loop controls during another exemplary SI to HCCI mode switch.

In order to further validate the control strategy, the system 100 was also tested at an engine speed of 1500 RPM and a load of 2.3 bar NMEP. The controller 124 was implemented at this point without any tuning The results are depicted in FIG. 19. FIG. 19 includes line 330 which indicates the $CA_{50}$ for closed-loop control while the line 332 indicates the $CA_{50}$ for open-loop control and the line 334 indicates the desired $CA_{50}$. Additionally, line 338 indicates NMEP for closed-loop control while the line 340 indicates the NMEP for open-loop control. Finally, line 342 indicates SOI for closed-loop control while the line 344 indicates the SOI for open-loop control. Even under the conditions of FIG. 19, the controller provides a smooth transition with reduced load fluctuations.

In the example of FIG. 19, the response provided by the closed-loop controller 124 is more similar to the open-loop case; however, the controller 124 produces a more desirable transient response by moving the injection timing earlier starting on cycle 10, and preventing the very late phasing on cycle 11 seen in open-loop. These results indicate that the controller 124 is able to successfully enable a robust mode switch from SI to HCCI.

The controller 124 thus maintains combustion phasing within a tighter range than an open-loop system, preventing cycles with either very early phasing (that can lead to ringing) or very late phasing (that can lead to misfire). The performance of controller 124 without any tuning at a very different operating point from where it was parameterized also points to the robustness of the control strategy.

The above described control system provides 1) decoupling of the valve switching dynamics from the combustion mode switching dynamics, thereby enabling an overall simpler control structure, 2) closed-loop control of actuators such as fuel injection timing, enabling robust cycle-by-cycle and cylinder individual control during the transition, 3) the use of a switched control/estimation scheme during the transition between SI and HCCI, with three distinct modes defined—SI, HCCI and an intermediate Transition mode for the last cycle before auto-ignition begins, 4) an estimator design for the Transition cycle that incorporates elements of both the SI and HCCI estimators, and 5) a concept for estimating the onset of the Transition cycle before auto-ignition through a threshold on states such as the mixture temperature.

While the invention has been illustrated and described in detail in the drawings and foregoing description, the same should be considered as illustrative and not restrictive in character. Only the preferred embodiments have been presented and all changes, modifications and further applications that come within the spirit of the invention are desired to be protected. For example, the disclosure is also useful for transitions to other intermediate modes between SI and HCCI such as spark-assisted compression ignition (SACI).

The invention claimed is:

1. An engine system comprising:
a first cylinder;
a first inlet valve configured to control the flow of gases into the first cylinder;
a first outlet valve configured to control the flow of gases out of the first cylinder;
a first throttle configured to control the flow of fuel into the first cylinder;
a memory including program instructions stored therein; and
a processor operably connected to the first inlet valve, the first outlet valve, the first throttle, and the memory, and configured to execute the program instructions to
control the first inlet valve and the first outlet valve in accordance with a spark ignition (SI) valve lift profile,
activate a first spark in the first cylinder while controlling the first inlet valve and the first outlet valve in accordance with the SI valve lift profile,
control the first inlet valve and the first outlet valve in accordance with a homogeneous charge compression ignition (HCCI) valve lift profile,
activate a second spark in the first cylinder while controlling the first inlet valve and the first outlet valve in accordance with the HCCI valve lift profile, and
control the start-of-injection (SOI) timing of the first throttle in an HCCI SOI mode while controlling the first inlet valve and the first outlet valve in the HCCI valve lift profile after activating the second spark.

2. The system of claim 1, wherein the processor is further configured to activate the first spark, activate the second spark, and control the SOI timing of the first throttle in an HCCI SOI mode on successive cycles.

3. The system of claim 1, wherein the processor is further configured to activate the second spark by:
obtaining SI engine states from an estimator;
performing a first feedback function with the obtained SI engine states with a closed loop controller; and
activating the second spark based upon the first feedback function.

4. The system of claim 3, wherein the processor is further configured to activate the second spark by:
performing a first feed-forward function with the closed loop controller; and
activating the second spark based upon the first feed-forward function.

5. The system of claim 4, wherein the first feedback function comprises a linear SI model.

6. The system of claim 5, wherein the first feed-forward function is a linear HCCI model.

7. The system of claim 6, wherein;
the linear SI model is given by matrices that are functions of first linearization points; and
the first linearization points are normalized values around steady state SI operating points.

8. The system of claim 7, wherein;
the linear HCCI model is given by matrices that are functions of second linearization points; and
the second linearization points are normalized values around steady state HCCI operating points.

9. The system of claim of claim 1, further comprising:
injecting fuel at a first crankshaft angle degree (CAD) prior to activating the first spark; and
injecting fuel at a second crankshaft angle degree (CAD) prior to activating the second spark, wherein the first spark and the second spark are activated in consecutive cycles and the second CAD is smaller than the first CAD.

10. A method of controlling an engine system, comprising:
providing a first cylinder with a first inlet valve, a first outlet valve, and a first throttle;
controlling the first inlet valve and the first outlet valve in accordance with a spark ignition (SI) valve lift profile;
activating a first spark in the first cylinder while controlling the first inlet valve and the first outlet valve in accordance with the SI valve lift profile;
controlling the first inlet valve and the first outlet valve in accordance with a homogeneous charge compression ignition (HCCI) valve lift profile;
activating a second spark in the first cylinder while controlling the first inlet valve and the first outlet valve in accordance with the HCCI valve lift profile; and
controlling the start-of-injection (SOI) timing of the first throttle in an HCCI SOI mode while controlling the first inlet valve and the first outlet valve in the HCCI valve lift profile after activating the second spark.

11. The method of claim 10, wherein activating the first spark, activating the second spark, and controlling the SOI timing of the first throttle in an HCCI SOI mode occur on successive cycles.

12. The method of claim 10, wherein activating a second spark comprises:
obtaining SI engine states from an estimator;
performing a first feedback function with the obtained SI engine states with a closed loop controller; and
activating the second spark based upon the first feedback function.

13. The method of claim 12, wherein activating a second spark further comprises:
performing a first feed-forward function with the closed loop controller; and
activating the second spark based upon the first feed-forward function.

14. The method of claim 13, wherein the first feedback function comprises a linear SI model.

15. The method of claim 14, wherein the first feed-forward function is a linear HCCI model.

16. The method of claim 15, wherein;
the linear SI model is given by matrices that are functions of first linearization points; and
the first linearization points are normalized values around steady state SI operating points.

17. The method of claim 16, wherein;
the linear HCCI model is given by matrices that are functions of second linearization points; and
the second linearization points are normalized values around steady state HCCI operating points.

18. The method of claim of claim 10, further comprising:
injecting fuel at a first crankshaft angle degree (CAD) prior to activating the first spark; and injecting fuel at a second crankshaft angle degree (CAD) prior to activating the second spark, wherein the first spark and the second spark are activated in consecutive cycles and the second CAD is smaller than the first CAD.

* * * * *